United States Patent
Ro et al.

[11] Patent Number: 6,137,767
[45] Date of Patent: *Oct. 24, 2000

[54] OPTICAL DISK MEMORY CONTENT DISPLAY APPARATUS, SYSTEM AND DISPLAY CONTROL METHOD

[75] Inventors: Se Yong Ro, Kyungki-Do; Sung Hyuk Park, Inchon, both of Rep. of Korea

[73] Assignee: LG Electronics, Inc., Seoul, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/928,486

[22] Filed: Sep. 12, 1997

[30] Foreign Application Priority Data

Sep. 20, 1996 [KR] Rep. of Korea ........................ 96/41360

[51] Int. Cl.[7] ........................................................ G11B 7/24
[52] U.S. Cl. .......................... 369/275.3; 369/14; 711/111
[58] Field of Search ................................ 369/273, 13, 14, 369/275.1, 275.2, 275.3; 711/111

[56] References Cited

U.S. PATENT DOCUMENTS 5,119,353  6/1992  Asakura .

FOREIGN PATENT DOCUMENTS 60-193184  10/1985  Japan .
62-262289  11/1987  Japan .
2230584    6/1992  Japan .

OTHER PUBLICATIONS

Patent Abstracts of Japan for Publication No. 07028484, published Jan. 31, 1995.
Patent Abstracts of Japan for Publication No. 07130148, published May 19, 1995.
Patent Abstracts of Japan for Publication No. 07307075, published Nov. 21, 1995.
Patent Abstracts of Japan for Publication No. 08045243, published Feb. 16, 1996.
Partial Translation of Japanese Patent Publication No. H02–230584, published Sep. 12, 1990.
Partial Translation of Japanese Patent Publication No. S60193184, published Oct. 1, 1985.
Partial Translation of Japanese Patent Publication No. S62–262289, published Nov. 14, 1987.
Partial Translation of Japanese Patent Publication No. H09–115277, published May 2, 1997.
Patent Abstract of Japanense Patent Publication No. H09–115277, published May 2, 1997.

*Primary Examiner*—Jack A. Lane

[57] ABSTRACT

An optical disk memory content display device, system and display control method are disclosed which are capable of more quickly retrieving an index of a data for a CD-RAM. An integrated circuit memory device (Memory In Disk: MID) is integrated with an optical disk to store the index of the data on the optical disk. A reader device is, e.g., integrated into a remote control device for the optical disk read/write device, reads the index stored in the IC memory device integrated with the optical disk.

17 Claims, 7 Drawing Sheets

OPTICAL DISK MEMORY CONTENT DISPLAY APPARATUS, SYSTEM AND DISPLAY CONTROL METHOD

FIELD OF THE INVENTION

The present invention relates to an optical disk memory content display apparatus, system and display control method, and in particular to an optical disk memory content display apparatus, system and display control method which are capable of more quickly retrieving an index of data regarding an optical disk using an input/output terminal of a memory chip (Memory In Disk: MID) integrated with the optical disk into/from which chip an index of a data is inputted/outputted.

BACKGROUND OF THE INVENTION

Generally, the optical disk is classified as one of a CD-I (Compact Disk Interactive Media), a photo-CD (Photo Compact Disk), a CD-ROM (Compact Disk ROM), a DVD (Digital Video Disk), and a CD-RAM. Digital data is optically recorded on each of these.

A CD-ROM typically has a label indicative of its contents. A user wishing to know the contents of a CD-ROM need only read the label. As such, it is not necessary for the user to insert the CD-ROM into the CD-ROM player device in order to know the contents of the CD-ROM. Because it is a read-only memory (ROM), the contents of the CD-ROM cannot be changed and the label will always accurately reflect its contents.

Recently, optical disks have been fabricated that can record data thereon and reproduce the thusly recorded data. In addition, in the optical disk, Disk information, namely, the content of the CD-RAM, is recorded on a recording region or table of contents (TOC) so that a user can read the content of the disk.

A CD-RAM can have its contents altered by the user. A label indicative of the contents must be updated diligently. Even so, there is no way to be sure the label accurately reflects the contents unless the CD-RAM is inserted into the corresponding read/write device and the table of contents (TOC) for the CD-RAM is read.

As shown in FIG. 1, the conventional CD-RAM optical disk 10 includes a data recording region 20 on which a data is recorded, a TOC (Table of Content) recording region 30 on which an index of a data is recorded, and a clamp region 40 formed between the TOC recording region 30 and a center hole 50 on which no data is recorded.

The operation of searching an index recorded on the CD-RAM optical disk will now be explained.

Since there is no apparatus for reading only an index, in order for a user to search the content of an index recorded in a TOC recording region, a disk must be mounted on a disk player (not shown) and then played. Thereafter, the content thereof is displayed on a monitor, so that a user can check the index displayed on the monitor.

Namely, when the disk is mounted on the disk player and then is played, an optical pick-up apparatus is driven for reading data recorded on the disk. A laser beam is radiated onto the TOC region of the disk and picks up a beam reflected from the surface of the disk, thus displaying the TOC information of the disk on the monitor.

For one CD-RAM, this TOC inspection process is not too inconvenient. For several CD-RAMs, this becomes laborious for the user. For each CD-RAM, the user must remove it from its jewel-case, open the tray of the read/write device, place the CD-RAM on the tray, close the tray, initiate a TOC read process by the read/write device, open the tray, remove the CD-RAM, and return the CD-RAM to its jewel-case. Then, the same must be done for CD-RAMs.

SUMMARY OF THE INVENTION

Accordingly, it is an object of the present invention to provide an optical disk memory content display apparatus, system and display control method which overcome the aforementioned problem encountered in the conventional art.

It is another object of the present invention to provide an optical disk memory content display apparatus, system and display control method which are capable of more quickly retrieving an index of a data using an output terminal of a memory chip (Memory In Disk: MID) installed in an optical disk from which chip an index of data is outputted.

To achieve the above objects, there is provided an optical disk memory content display apparatus according to an embodiment of the present invention which includes, in a remote controller of an optical disk read/write device, an optical disk memory content display apparatus comprising: an input interface, under control of a controller, for reading an index of data stored in a memory chip integrated with an optical disk; a memory for at least temporarily storing said index of a data read through said input interface; a display unit for displaying said index of data stored in the memory unit or inputted thereto through the input terminal; and a controller for causing said index of data read through said input interface to be stored into said memory, and for causing said index to be displayed on said display unit.

These and other objects of the invention are also achieved by providing a system for displaying a data index of an optical disk, the system comprising: an optical disk integrated with an integrated circuit (IC) memory device, said IC memory device having input/output terminals; and a reader device for reading said IC memory device optical disk integrated with said optical disk.

To achieve the above objects, in accordance with another embodiment of the invention, there is provided an optical disk memory content display control method which comprises the steps of: detecting a signal from a user interface of said remote control device; judging if said signal corresponds to a display control signal; displaying, if said signal is a display control signal, an index of data stored in a memory of said remote control device; detecting, if no signal from a user interface is detected, whether input/output terminals of said remote control device are in contact with corresponding terminals of an optical disk; reading, if said terminals are determined to be in contact, an index of data of an optical disk; storing the newly-read index in said memory; and displaying said index of said memory on a display unit.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the-invention will become apparent to those skilled in the art from this detailed-description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 2A and 2B are views illustrating the construction of an optical disk with a memory, of which:

FIG. 2A is a view illustrating an optical disk integrated with a memory device; and FIG. 2B is a view illustrating an alternative arrangement of the output terminals of the memory device on the optical disk;

DETAILED DESCRIPTION OF THE INVENTION

The optical disk memory content display apparatus and a display control method according to the present invention will now be explained with reference to the accompanying drawings.

Figure 1:
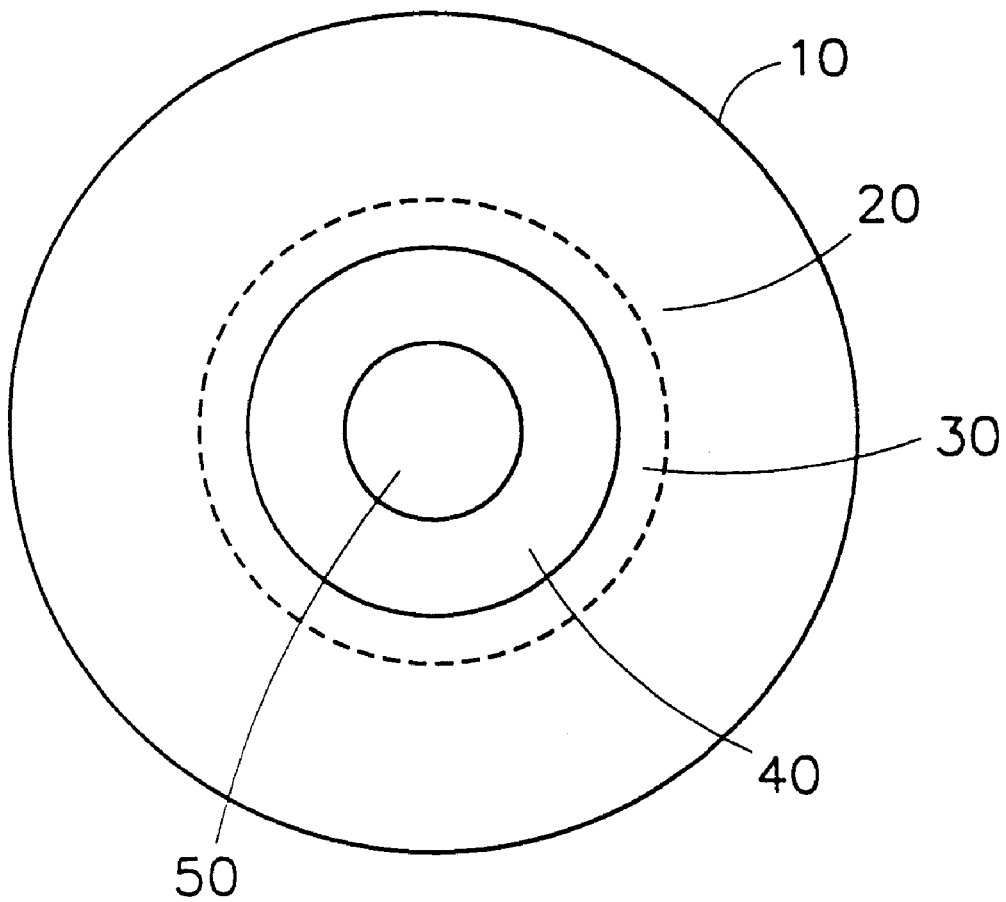
FIG. 1 is a view illustrating a recording region of a conventional optical disk.
Figure 2A:
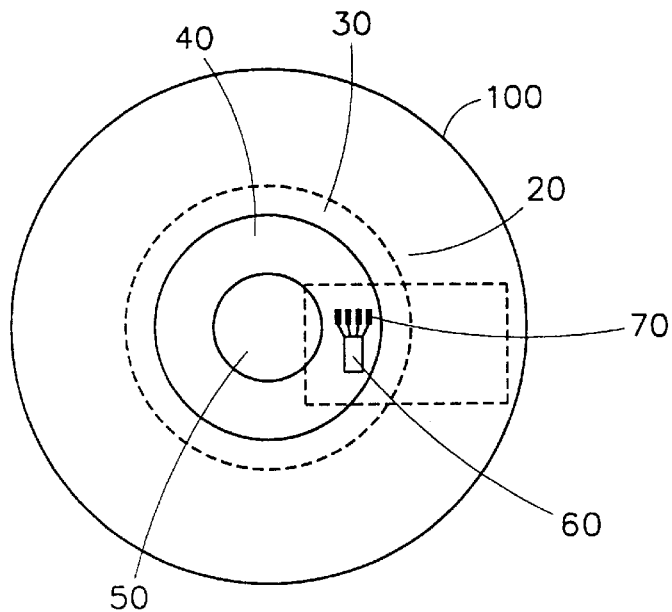

The optical disk 100, as shown in FIG. 2A, is the subject matter of related, co-pending and commonly assigned U.S. patent application Ser. No. 08/852,563, filed May 7, 1997, now U.S. Pat. No. 5,940,363, in the name of Se-Yong Ro and Sung-Hyuk Park, entitled "Memory chip Mounted Optical Disk," which is hereby incorporated by reference in its entirety. The optical disk 100 includes a data recording region 20 on which data is recorded, a TOC (Table of Content) recording region 30 on which an index of data is recorded, and a clamp region 40 formed between the TOC recording region 30 and a center hole 50 on which no data is recorded. An integrated circuit memory device (Memory In Disk: MID) 60 is installed in the optical disk 100 for recording an index of the data.

The memory chip (MID) 60 is formed preferably thinner than the thickness of the optical disk 100 and is insertable within the optical disk 100. In more detail, the memory chip 60 (MID) is installed between the center hole 50 of the optical disk 100 and the TOC recording region 30, namely, the memory chip 60 is installed in the clamp region 40 on which no data is recorded.

For simplicity of illustration, only four input/output terminals 70 are depicted on a surface of the memory chip 60. The terminals 70 are provided so that the optical disk read/write device can write to the memory chip 60 and so that the memory content display apparatus can contact the IC memory device 60. The exact number of input/output terminals will vary depending upon the particular hardware chosen to implement the invention; such variation is within the ordinary level of skill in the art. The input/output terminals 70 include a power input terminal (VCC), a ground terminal (GND), a clock signal input terminal (CLK), and a data input/output terminal (DATA).

Figure 2B:
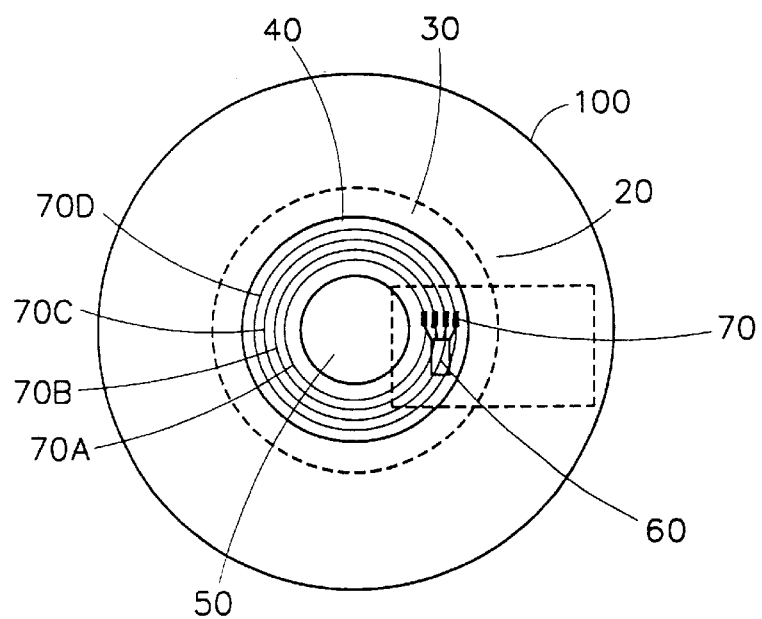

An alternative arrangement of the input/output terminals 70 of FIG. 2A is depicted in FIG. 2B. In FIG. 2B, the input/output terminals 70A, 70B, 70C and 70D are shaped as annuluses to facilitate alignment with the input interface terminals of the optical disk read/write device, to be discussed in more detail below.

Figure 3:
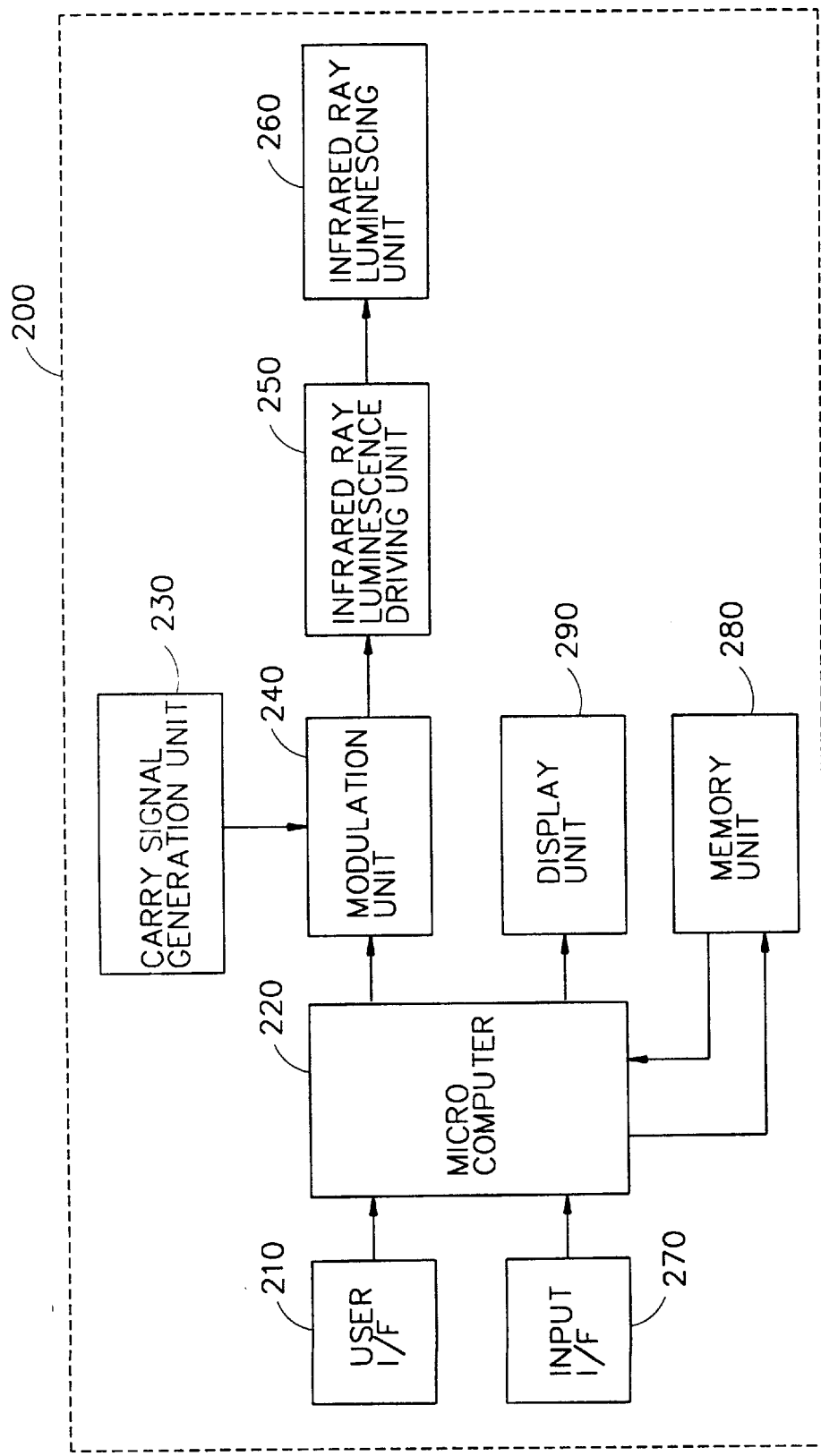
FIG. 3 is a block diagram illustrating a memory content display apparatus according to the present invention.
Figure 4:
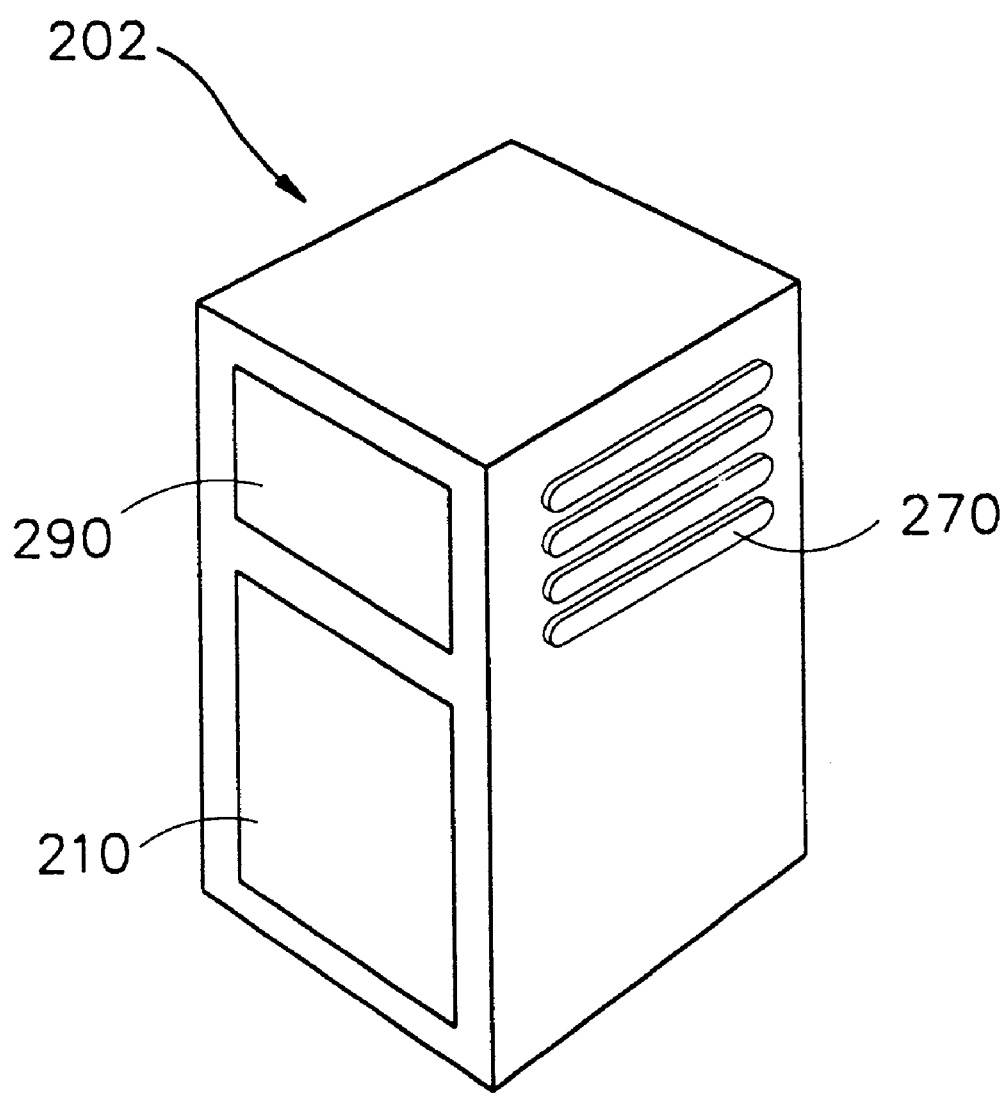
FIG. 4 is a perspective view illustrating a memory content display apparatus corresponding to the embodiment of FIG. 3.

A memory content display apparatus 200 of FIG. 3 for the optical disk, which is capable of reading an index stored in the memory device of the optical disk 100 and displaying the content of the index of the data, is preferably included within a remote controller of the optical disk read/write device, as depicted in FIG. 4 (to be discussed below). The remote controller 200 includes a user interface, e.g., a keypad, 210 for inputting a user's command, a microcomputer 220 for recognizing a command signal of a user inputted through the user interface 210 and for controlling each of elements (as described below), a carry signal generation unit 230 for generating a carry signal for remotely controlling the optical read/write device, a modulation unit 240 for modulating a carry signal generated by the carry signal generation unit 230 in accordance with a control signal from the microcomputer 220, an infrared ray luminescence driving unit 250 for amplifying the carry signal modulated by the modulation unit 240, and an infrared ray luminescing unit 260 (driven in accordance with an output from the infrared ray luminescence driving unit 250) for transmitting a corresponding signal to the optical disk read/write device.

There are further connected an input interface 270 (controlled by the microcomputer 220) for reading an index of data by physical contact with the input/output terminals 70 of the memory chip 60 of the optical disk 100. The input interface 270 has terminals commensurate in number and arrangement with the terminals 70 of the IC memory device 60. FIG. 3 also depicts a memory unit 280 for storing an index of data that was read by the input interface 270, and a display unit 290 for displaying the index of data stored in the memory unit 280.

The input interface 270 includes, e.g., a mechanically rotatable electrical connector (not shown) that transfers the electrical signals on the terminals of the input interface 270 to the microcomputer 220. The rotatable electrical connector is integrated with the clamp assembly that holds the optical disk 100. Such a rotatable electrical connector is known to one of ordinary skill in the art.

FIG. 4 illustrates the memory content display apparatus as preferably, but not necessarily, integrated into a remote control device 202. The memory content display apparatus 200 includes a user interface 210 for inputting a user's command, a display unit 290 for displaying an index of data, and an input interface 270 for reading an index of the data through physical contact with the input/output terminals 70 disposed of the memory chip 60 of the optical disk 100.

Figure 7:
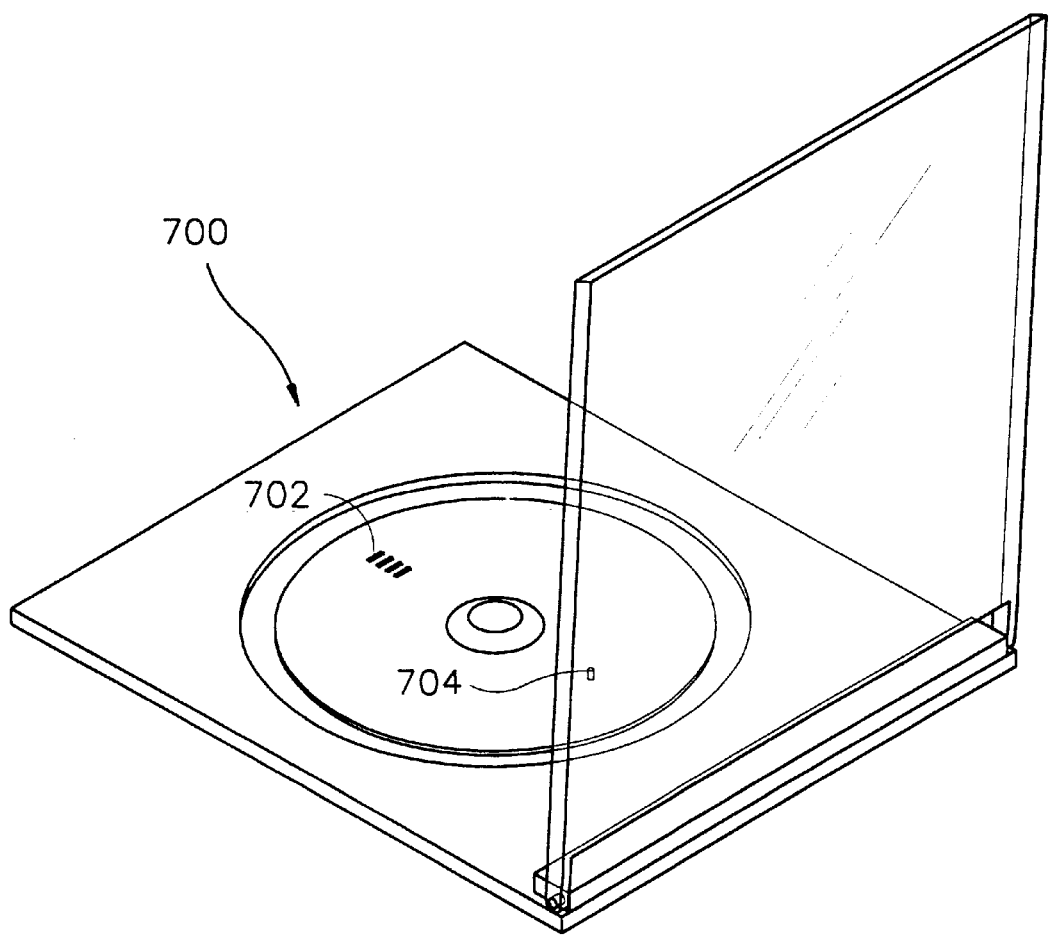
FIG. 7 depicts a jewel-type case for storing an optical disk in accordance with anther embodiment of the invention.

FIG. 7 depicts a jewel-type case for storing the CD-RAM according to an embodiment of the present invention. Jewel-type cases for storing CD-ROMs are generally known. The jewel-type case 700 of FIG. 7 is similar to the known jewel-type cases except that it includes internal terminals 702 that align with the input/output terminals 70 of the memory device 60. Alignment is facilitated, e.g., by an orientation pin 704 that has a matching hole (not shown) in the optical disk that causes the terminals 70 of the IC memory device 60 to align with the internal terminals 702 of the jewel-type case 700. Alternatively, to facilitate alignment, the internal terminals of the case 700 could be formed as annuluses as in FIG. 2B.

The internal terminals 702 of the jewel-type case 700 are connected to external terminals (not shown) corresponding in number and arrangement to the terminals of the input interface 270 of the memory content display apparatus 200. With an optical disk in the case 700, a user can position the terminals of the input interface 270 into contact with the external terminals of the case 700, which indirectly connects the terminals of the input interface 270 to the output terminals of the IC memory device.

The operation of the optical disk memory content display apparatus and system according to the present invention will now be explained with reference to the accompanying drawings.

Whenever new data is recorded on the optical disk 100, an index of the data is recorded and stored in the memory chip through the input/output terminals 70 as shown in FIG. 2A by a data storing unit or a recording unit disposed in the disk player.

In addition, as shown in FIGS. 2A through 4, the input interface 270 disposed in the memory content display apparatus 200 physically contacts with the input/output terminals 70 of the optical disk 100 in order for the memory content display apparatus 200 to read the index of the data stored in the optical disk 100.

When a user inputs a command signal through the user interface 210 of the memory content display apparatus 200, the microcomputer 220 determines whether the command signal from the user interface 210 corresponds to a signal for displaying the index of the data from the optical disk 100 or to a remote control signal that will result in a common infrared ray transmission signal.

If the signal is determined to be a remote control signal, the modulation unit 240 modulates a carry signal from the carry signal generation unit 230 and outputs the modulated carry signal to the infrared ray luminescence driving unit 250 in accordance with a control signal from the microcomputer 220. The infrared ray luminescence driving unit 250 outputs a driving signal to the infrared ray luminescing unit 260, and the infrared ray luminescing unit 260 outputs a common infrared ray signal to an externally connected unit.

If the signal is determined to be a signal for displaying an index of the data, the memory unit 280 outputs a data index of the optical disk 100 that has been stored in the memory unit 280 to the display unit 290 in accordance with a control signal from the microcomputer 220, and the display unit 290 displays the data index.

However, if there is no command signal from a user, the microcomputer 220 judges whether the input/output terminals 70 of the optical disk 100 are in contact with the terminals of the input interface 270 disposed in an outer wall of the remote control device.

If the input terminals 270 of the display apparatus are determined to be in contact with the input/output terminals 70 of the optical disk 100, the microcomputer 220 outputs a control signal to the terminals of the input interface 270 for reading a data index from the memory chip 60 of the optical disk 100 through the input/output terminals 70 of the optical disk 100.

The input interface 270 outputs the data index read through the input/outputs terminal 70 of the optical disk 100 to the microcomputer 220. The data index read through the input interface 270 is outputted to the display unit 290 and also to the memory unit 280, respectively.

The data index stored in the memory unit 280 can be displayed on the display unit 290 in response to a user command signal even when a user does not bring the input/output terminals 70 of the optical disk 100 into contact with the terminals of the input interface 270 of the display apparatus, so that the user can easily check the content of the optical disk.

The process by which the microcomputer 220 of the memory content display apparatus reads a data index from the input/output terminal of the optical disk 100, stores and displays the same will now be explained with reference to FIGS. 5 and 6.

Figure 5:
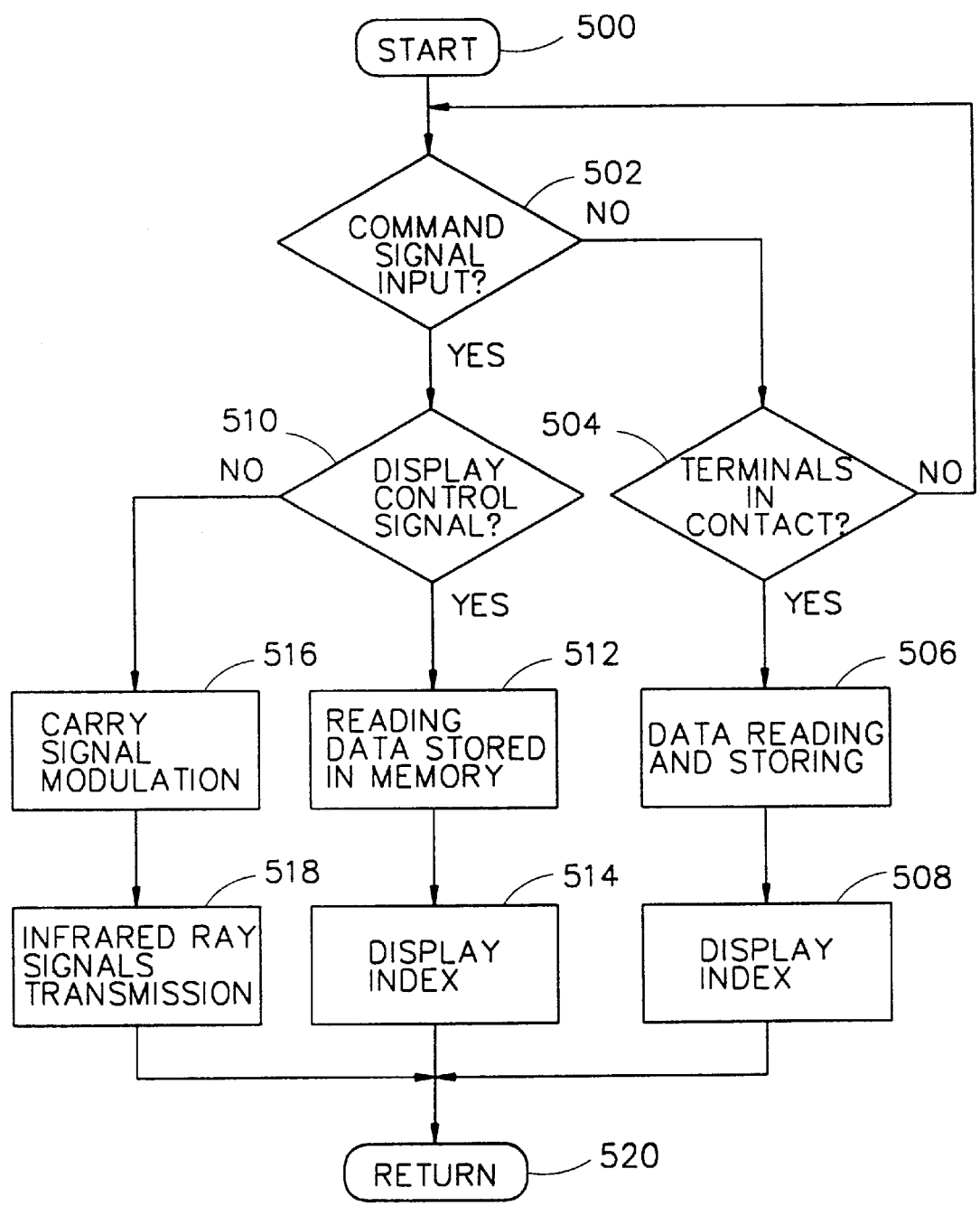
FIG. 5 is a flow chart illustrating method for controlling the memory content display apparatus of FIG. 3.

The flow chart of FIG. 5 begins with the start box 500. Next, at decision box 502, it is determined whether a command input signal has been received. If not, then flow proceeds to the decision box 504, where it is determined whether the terminals of the input interface 270 are in contact with the terminals 70 of the IC memory chip of the optical disk. If not, then flow proceeds back to the decision box 502. If so, then flow proceeds to the box 506, where data reading and storing is performed, to box 508, where the data index is displayed, and then to box 520, where the flow terminates.

If a command input signal has been recognized at the decision box 502, then flow proceeds to the decision box 510, where it is determined if a display control signal has been received from the user interface. If so, then flow proceeds to the box 512, where the data index is read from the memory, to the box 514, where the data index is displayed, and then to the box 520, where the flow terminates. If it is determined at the decision box 510 that no display control signal has been received, then flow proceeds to the box 516 where the carry signal modulation is carried out, to the box 518 where the infrared ray signal transmission is carried out, and then to the termination box 520.

Figure 6:
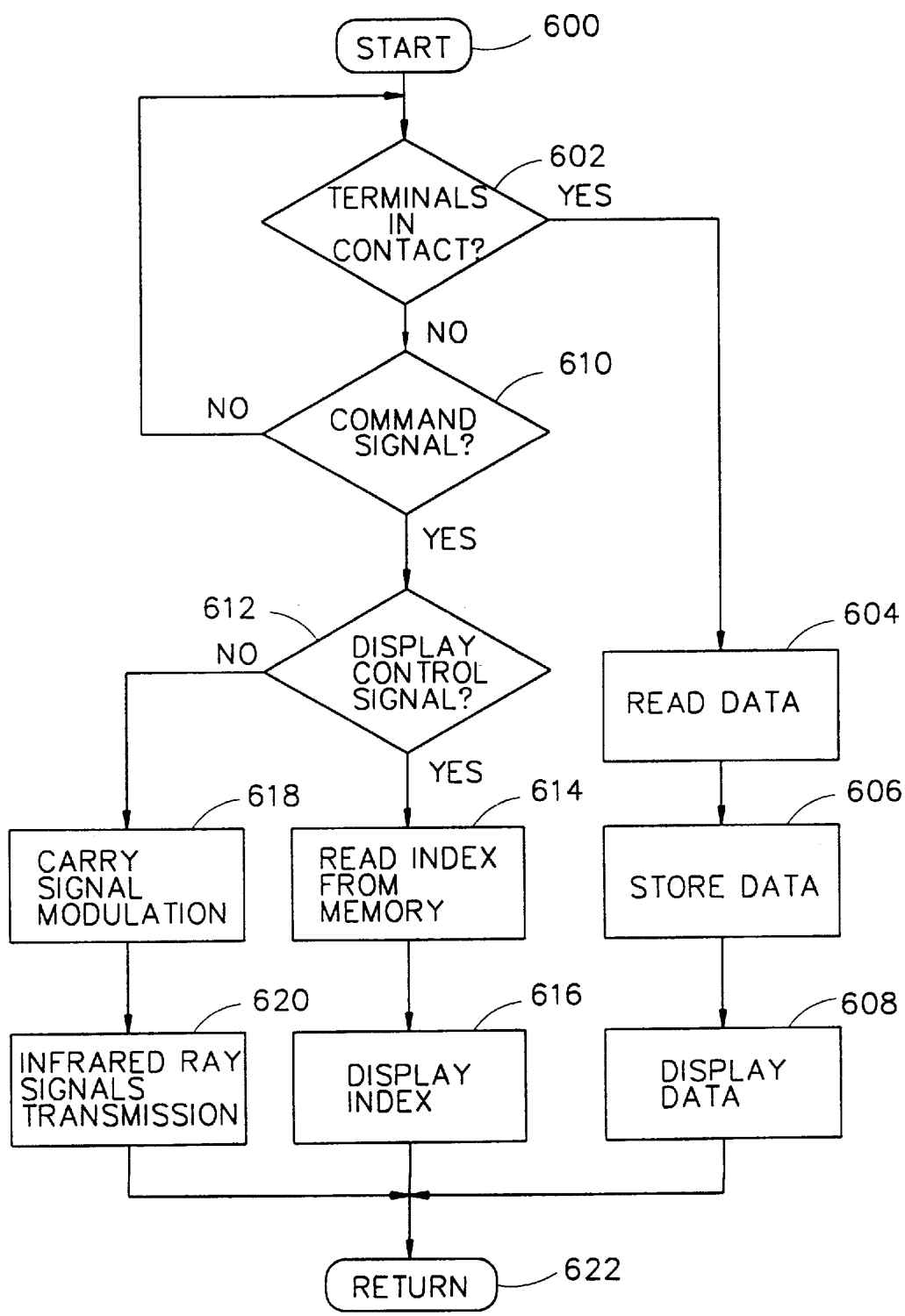
FIG. 6 is a flow chart of an alternative method for controlling the memory content display apparatus of FIG. 3.

FIG. 6 is a flow chart depicting an alternate sequence of the steps depicted in FIG. 5. Flow in FIG. 6 begins at the start box 600 and proceeds to the decision box 602, where it is determined whether the terminals are in contact. The decision box 602 corresponds to the decision box 504. If so, then flow proceeds to the boxes 604, 606 and 608, and then to the termination box 622. The boxes 604, 606, and 608 correspond to the boxes 506 and 508 of FIG. 5. If the result of the decision box 602 is that the terminals are not in contact, then flow proceeds to the decision box 610, where it is determined whether a command signal has been received. The box 610 corresponds to the box 510. If the result of the decision box 610 is that no command signal has been received, then flow returns to the decision box 602. Otherwise, flow proceeds from the decision box 602 to the decision box 612, which corresponds to the decision box 510. At that point, FIG. 6 is similar to FIG. 5. In other words, the boxes 510, 512, and 514 correspond to the boxes 612, 614, and 616, while the boxes 516 and 518 correspond to the boxes 618 and 620, respectively.

As described above, in the present invention, it is possible to quickly retrieve the index of the data on an optical CD-RAM through physical contact between terminals of the input interface of the display apparatus and input/output terminals of the IC memory device of the optical CD-RAM. Thus, the problem of having to use the disk player in order to check the content or data index of the optical disk is overcome.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A recordable/rewritable optical disk memory content display apparatus comprising:

an input interface under the control of a controller, for reading index data stored in a memory chip integrated with the recordable/rewritable optical disk by physical contact with input/output terminals of the memory chip, said index data representing an index of data stored in a recording region of the optical disk, wherein said index data stored in the memory chip is updated automatically through the input/output terminals when data stored in the recording region of the recordable/rewritable optical disk is changed;

a memory unit for at least temporarily storing said index data read through said input interface;

a display unit for displaying said index data stored in the memory unit or inputted thereto through the input interface; and a controller for causing said index data read through said input interface to be stored into said memory unit, and for causing said index data to be displayed on said display unit.

2. The apparatus of claim 1, wherein said input interface has a plurality of conductive terminals commensurate in number and a arrangement with conductive terminals on said recordable/rewritable optical disk.

3. The apparatus of claim 1, wherein said memory unit is operable to store said index data after said index data is initially read and displayed, said controller also being operable to cause said index data in said memory unit to be displayed again on said display unit in response to a user's display request.

4. The apparatus of claim 3, wherein said memory unit is operable to store said index data until new index data is read by said input interface at which time said controller is operable to cause said new index data to be written over the previously stored index data.

5. A system for displaying index data of a recordable/rewritable optical disk, the system comprising:

a recordable/rewritable optical disk integrated with an integrated circuit (IC) memory device, said IC memory device having input/output terminals and storing said index data relating to a data recorded in a data recording region, wherein said index data is automatically updated through the input/output terminals when the data in the recording region of the recordable/rewritable optical disk is changed; and a reader device for reading said IC memory device integrated with said recordable/rewritable optical disk by physical contact with the input/output terminals of the IC memory device, wherein said reader device has an input interface to read the data stored in the IC memory device.

6. The system of claim 5, wherein said reader device further comprises:

a memory unit for at least temporarily storing said index data read by said input interface;

a display; and a controller for causing said input interface to read said index data, for causing said index data to be stored in said memory unit, and for causing said index data to be displayed on said display.

7. The system of claim 6, wherein said controller is also for detecting whether said input interface terminals are in contact with corresponding terminals of said IC memory device on a recordable/rewritable optical disk; and wherein said controller is also for causing said input interface to read the index data if said terminals are in contact, respectively.

8. The system of claim 6, wherein said memory unit is operable to store said index data after said index data is initially read and displayed;

wherein said controller is also for detecting if a signal is received from a user interface of said remote control;

wherein said controller is also for determining, if a user interface signal is detected, whether said user interface signal is a display signal;

wherein said controller is also for reading, if said user interface signal is a display signal, said index data from said memory unit; and wherein said controller is also for again displaying said index data.

9. The system of claim 5, further comprising:

a remote control device for remotely controlling said optical disk read/write device, wherein said remote control device including said reader device.

10. The system of claim 5, wherein said output terminals of said IC memory device are concentric annuluses.

11. The system of claim 5, wherein said input interface has terminals corresponding in number and arrangement to terminals of said IC memory device;

wherein said system further comprises a jewel-type case having external terminals and internal terminals corresponding in number and arrangement to terminals of said IC memory device, respectively, said external terminals being connected to said internal terminals such that when said terminals of said input interface of said index-only reader device are brought into contact with said external terminals and when said output terminals of said IC memory device of said optical disk are brought into contact with said internal terminals, then said terminals of said of said input interface are indirectly connected to said output terminals of said IC memory device.

12. A method of displaying index data of a recordable/rewritable optical disk, the method comprising:

detecting whether input interface terminals are in contact with corresponding terminals of a memory device on the recordable/rewritable optical disk;

reading, if said terminals are in contact, respectively, index data of said recordable/rewritable optical disk, wherein said index data is automatically updated through the input/output terminals when data in the recording region of the recordable/rewritable optical disk is changed;

at least temporarily storing said index data; and displaying said index data.

13. The method of claim 12, further comprising:

continuing to store said index data after said index data is initially read and displayed;

detecting if a signal is received from a user interface;

determining, if the signal from the user interface is detected, whether said signal from the user interface is a display signal;

reading, if said signal from the user interface is the display signal, said index data from said memory; and again displaying said index data.

14. A recordable/rewritable optical disk memory content display control method, the control method comprising:

detecting a signal from a user interface of a remote control device;

judging if said signal corresponds to a display control signal;

displaying, if said signal is a display control signal, index data stored in a memory of said remote control device;

detecting, if no signal from the user interface is detected, whether input/output terminals of the remote control device are in contact with corresponding terminals of a recordable rewritable optical disk;

reading, if said terminals are determined to be in contact, index data stored in a memory chip integrated with the recordable rewritable optical disk, wherein said index data is automatically updated through the input/output terminals when data in the recording region of the recordable/rewritable optical disk is changed;

storing the newly-read index data in said memory of the remote control device; and displaying said index data of said memory of the remote control device on a display unit.

15. In a recordable/rewritable recording medium having a memory device mounted thereon, the recordable/rewritable recording medium comprising:

a substrate having a center hole;

a clamp region to the outer direction of the center hole;

a read-in region by the clamp region;

a data recording region; and a read-out region, wherein the memory device installed in a region on which data are not recorded, said memory device including input/output terminals which are shaped as annuluses to facilitate alignment with input interface terminals of a recordable/rewritable recording medium read/write device, and said memory device storing index data corresponding to the data recorded in the data recording region.

16. The recording medium of claim 15, wherein said index data stored in the memory device is updated automatically through the input/output terminals when the data recorded in the data region is changed.

17. The recording medium of claim 15, wherein said index data stored in the memory device is updated automatically through the input/output terminals when control data recorded in the read-in data region of the recording medium is changed.

* * * * *